O. E. FLOBERG.
POTATO CUTTER.
APPLICATION FILED JULY 15, 1921.

1,419,036.

Patented June 6, 1922.
3 SHEETS—SHEET 2.

Inventor
O. E. Floberg.

By Lacey Lacey
Attorney

O. E. FLOBERG.
POTATO CUTTER.
APPLICATION FILED JULY 15, 1921.
1,419,036.
Patented June 6, 1922.
3 SHEETS—SHEET 3.
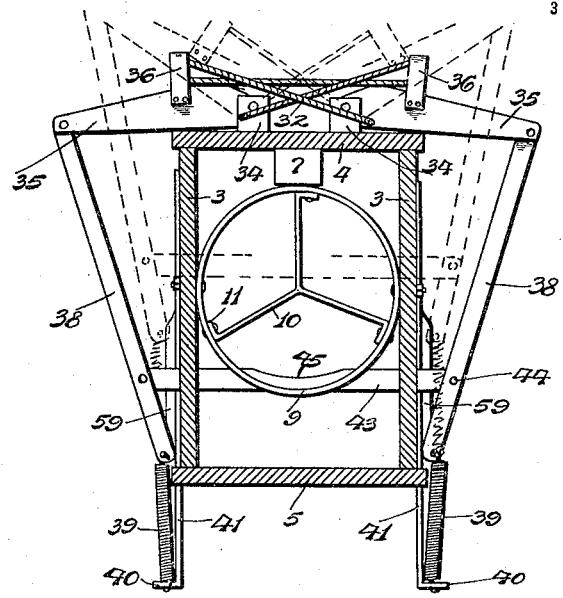
Inventor
O. E. Floberg.

UNITED STATES PATENT OFFICE.

OLE E. FLOBERG, OF SHELLY, MINNESOTA.

POTATO CUTTER.

1,419,036.  Specification of Letters Patent.  Patented June 6, 1922.

Application filed July 15, 1921. Serial No. 484,968.

*To all whom it may concern:*

Be it known that I, OLE E. FLOBERG, citizen of the United States, residing at Shelly, in the county of Norman and State of Minnesota, have invented certain new and useful Improvements in Potato Cutters, of which the following is a specification.

This invention is an apparatus for cutting seed potatoes preparatory to planting and has for its object the provision of an efficient mechanism whereby the potatoes will be fed to and forced past knives so as to be expeditiously cut into small pieces. The invention seeks further to provide means whereby after the potatoes have been forced past stationary knives, they will be acted upon by a movable cutter so as to be further divided. A further object of the invention is to provide simple means whereby the potatoes will be guided to the stationary cutters so as to be positively acted upon by the same, and a still further object of the invention is to provide means whereby the passage of the potatoes to the cutters may be controlled and choking of the apparatus will be prevented. These stated objects and such other objects as will appear incidentally in the course of the following description are attained in such a mechanism as is illustrated in the accompanying drawings and the invention resides in certain novel features which will be particularly pointed out in the claims following the description.

In the drawings—

Figure 1 is a perspective view of one embodiment of my invention;

Fig. 3 is a transverse vertical section;

Fig. 4 is a horizontal section;

Fig. 7 is a detail perspective view of the valve for controlling the passage of potatoes to the knives.

Figure 2:
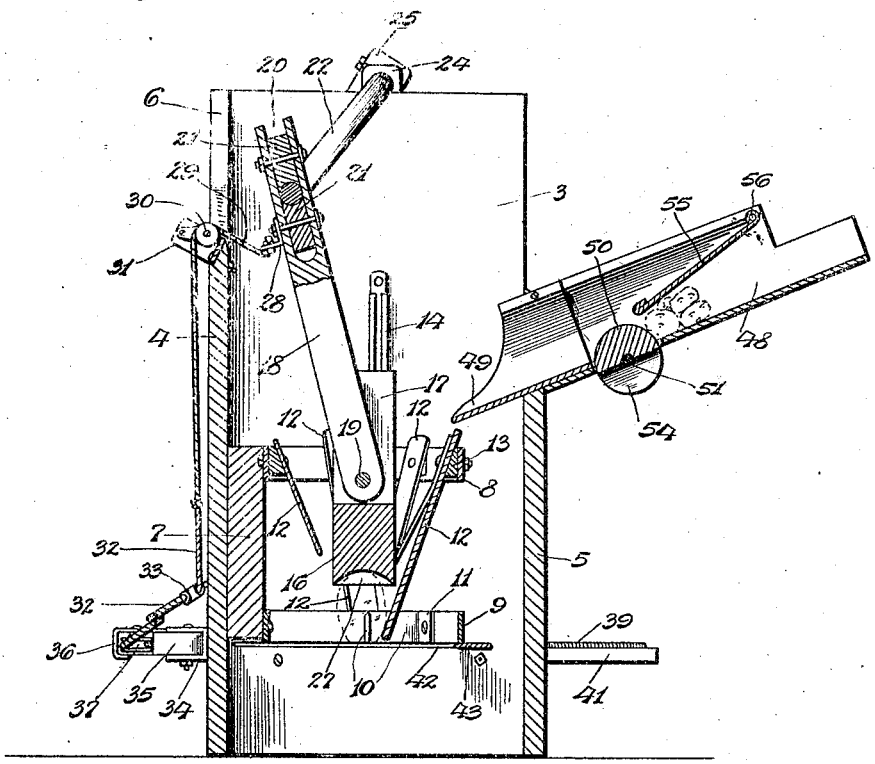
Fig. 2 is a longitudinal vertical section of the same.

In carrying out my invention, I employ a casing which may be supported upon any convenient structure and is illustrated as disposed upon a table-like support 1, the top of the table being, of course, provided with an opening through which the cut potatoes may pass to a receptacle 2 placed beneath the same. The casing is of a general tubular formation and is illustrated as consisting of side walls 3, a front wall 4, and a back wall 5 which terminates short of the upper ends of the side walls. The front wall 4 is provided in its upper end with a notch or open-ended slot 6 to accommodate the movement of a pitman and a cable or chain which will be presently particularly described. Within the casing, I secure to the front wall 4 a post or bracket 7 and to the said bracket I secure supporting rings 8 and 9 which are also secured to the side walls, as shown in Figs. 3 and 4. Disposed within and secured to the lower ring 9 are stationary knives 10 which, in Fig. 4, are shown as consisting of three blades joined at their inner ends and provided at their outer ends with lugs or feet 11 through which suitable fastening devices are inserted to secure the knives to the ring, the junction of the inner ends of the knives being located at the center of the ring. To the inner side of the upper ring 8, I secure the upper ends of guiding fingers 12 which are preferably resilient plates converging downwardly so that the potatoes deposited thereon will be directed toward the center of the stationary knife or knives. As shown most clearly in Fig. 2, these guides are arranged in two series of different lengths, so that potatoes of different sizes will be fed positively to the stationary knife and will be prevented from dropping to the outer sides of the guides and, consequently, passing through the machine without being cut. Fillers 13 are arranged between the ring 8 and the outer sides of the guides so that shifting of the guides about the securing elements will be avoided and a firm base against which they may be held will be provided. Upon the side walls of the casing and disposed vertically thereon, are guides 14 which may conveniently be split tubes, or plates having spaced overhanging flanges, and in these guides are engaged runners which are illustrated as consisting of pins 15 projecting laterally from the sides of a plunger 16. The upper end of the plunger is slotted or recessed, as shown at 17, to receive the lower end of a pitman 18, which is pivoted to the plunger, as shown at 19, and the upper end of which is forked, as shown at 20, to receive bearing blocks 21 engaging the crank 22 of a driving shaft 23 which is journaled in suitable bearing brackets 24 secured upon the side walls at the upper ends thereof. One end of this driving shaft is equipped with a crank handle 25 and upon the opposite end of said shaft is secured a sprocket wheel 26. The lower end of the plunger is preferably cupped, as shown at 27, whereby it will readily engage the potatoes and force them to the stationary knives.

To the pitman, near the upper end thereof, I secure a bracket 28 in which one end of a cable or chain 29 is secured, the said cable extending outwardly through the recess or slot 6 of the front wall of the casing and passing over a pulley 30 which is located at the base of said slot or recess and carried by a bracket 31 secured upon the front wall of the casing. The cable or other flexible connection passes downwardly from the guide pulley or roller 30 and has its lower end attached to branch cables 32 which diverge toward the sides of the casing and are trained around guide pulleys 33 supported on the front wall, as shown in Fig. 1. Below the guide pulleys 33, I secure to the front wall of the casing brackets 34 in which are pivotally mounted levers 35 which extend laterally and project beyond the sides of the casing. Brackets 36 are secured to and project forwardly from these levers 35, near the fulcrums thereof, and guide rollers or pulleys 37 are mounted in the said brackets, the cables 32 being extended across the front of the casing in opposite directions from the pulleys 33 to the pulleys 37, after which they are passed around the pulleys 37 and united between the same. The branch cables may obviously be a single cable or flexible connection trained around the pulleys in the described manner and united with the lower end of the cable 29. To the outer ends of the levers 35, I pivot the front ends of links 38 which extend inwardly and rearwardly from the levers and have the front ends of retractile springs 39 secured thereto. The said springs 39 are secured at their rear ends to lugs or offsets 40 at the rear ends of supporting and guide arms 41 which are secured to and project rearwardly from the side walls of the casing and are located immediately below horizontal slots 42 in said walls. The movable knife 43 extends across the casing with its ends projecting through and playing in the said slots 42 and said ends of the knife are pivoted to the respectively adjacent links 38, as shown at 44. In the operation of the machine, the rotation of the driving shaft exerts a pull upon the cables which is translated into swinging movements of the levers and the movable knife is drawn forwardly within the casing immediately below the stationary knives, the springs 30 being distended by such action and serving by their retraction to return the movable knife to its initial position. As shown in Figs. 2, 3 and 4, the knife 43 consists of a single blade having a shallow concave recess 45 in its cutting edge at its center whereby it will engage the potatoes without rotating the same and this single blade will be sufficient if small potatoes are being passed through the apparatus. If the potatoes, however, are very large, a supplemental knife 46 may be secured to the under side of the blade 43 so that two cuts will be formed across the potatoes at the same time. This supplemental knife 46 consists of a blade having one end bent upwardly, as at 47, to provide a foot whereby it may be conveniently secured to the upper blade, the opposite end of the knife being free so that it may yield slightly to the impact against the potatoes and thereby avoid crushing of the same.

The potatoes are fed into the casing through a delivery spout or chute 48 which is secured to the back wall of the casing and extends into the casing so that its delivery end 49 will overhang the upper ring 8 and the guides 12 carried by said ring. Near the delivery end of the spout, a valve is provided to prevent the potatoes flowing in masses to the cutters and said valve consists of a roller or drum 50 carried by a shaft 51 which is journaled in the bottom of the chute and has one end equipped with a sprocket wheel 52 around which and the sprocket 26 is trained a chain 53. The roller 50 is provided with a recess 54 between its ends, and it will be readily understood from reference to Fig. 2 that, when this recess 54 is at the under side of the roller, the flow of potatoes through the chute will be arrested by the unmutilated portion of the roller. The rotation of the roller will bring the recess or mutilated portion 54 upwardly into the chute and one or more potatoes may then pass into the said recess and be permitted to escape to and through the discharge end of the chute as the rotation of the roller continues. To prevent the potatoes passing over the roller when it is in the position shown in Fig. 2, I provide a check device 55 consisting of a plate pivoted at its upper end, as at 56, within the chute and having its lower end free so that the weight of the plate or arm will swing the said free end toward the bottom of the chute adjacent the roller and, consequently, bear upon the potatoes and cooperate with the roller to arrest the movement of the potatoes. As a potato, however, is taken up by the engagement of the same with the mutilated portion of the roller, the check arm will yield sufficiently to permit the passage of the potato so that the potatoes will flow into the casing in a sufficiently steady stream to maintain a supply under the plunger at all times, but crowding of the potatoes into the apparatus and consequent jamming and crushing thereof between the plunger and the guides will be avoided.

Figure 5:
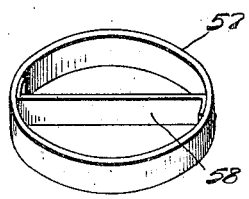
Fig. 5 is a detail perspective view showing a form of stationary knives slightly different from that shown in the previously mentioned figures.
Figure 6:
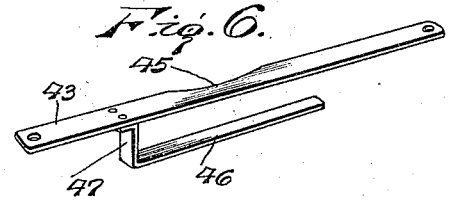
Fig. 6 is a detail perspective view showing another form of movable knife.

While I have shown a three-armed knife in Fig. 4, other forms of knives may be used and, in Fig. 5, I have shown the stationary cutter consisting of a supporting ring 57 and a single knife 58 secured within the same on a diameter thereof.

The operation of the apparatus is thought to be readily understood from what has been said. A supply of potatoes is fed into the chute 48 and will gravitate through the same until arrested by the retarding device 55 and the valve. The driving shaft 23 is rotated by means of the handle 25 and this rotation will cause the crank 22 to pull upwardly on the pitman 18 whereby the plunger 16 will be raised above the upper ring 8 and the cable 29 or other flexible connection will be drawn upwardly. The upward movement of the plunger will permit potatoes to drop below the same and the downward movement of the plunger will engage the potatoes and force them against and past the stationary knives. The upward pull exerted upon the flexible connection 29 will cause the levers 35 to swing forwardly and thereby draw the knife 43 toward the front wall of the casing across the lower edges of the stationary knives so that the pieces of potatoes will be cut transversely as they drop below the stationary knives and the pieces passing through the open end of the casing into the receptacle 2 will be of proper size for planting. As the crank 22 passes its high point and starts to descend in its rotation, the springs 39 will retract and withdraw the knife 43 toward the rear of the casing to its initial position, the levers 35 obviously following this movement and the flexible connection 29 being thereby kept taut at all times. The valve roller 50 will be rotated obviously simultaneously with the rotation of the driving shaft through the chain and sprocket gearing shown and described so that the potatoes will be fed at regular intervals into the apparatus. The potatoes which are permitted to pass by the operation of the valve will roll from the discharge end of the chute over the upper ends of the guides 12 and will then pass to the lower ends of the same and rest upon the stationary knife in position to be forced past the said knife by the descending plunger. The guides 14 and the runners 15 working in said guides hold the plunger to a rectilinear path so that its engagement with the potatoes will be positive and certain and the parts are obviously so timed that the feeding of potatoes will occur when the plunger is raised and be arrested while the same is descending. The arms 41 are constructed with lateral ribs 59 which reinforce them and prevent buckling thereof and the said arms cooperate with the slots 42 as guides for the sliding knife.

My improved potato-cutting mechanism is compact, strong, durable, and the working parts are protected by the casing so that injury thereto through accidental blows is not apt to occur and the mechanism will be in operative condition at all times. The machine is easily operated and by its use a large quantity of potatoes may be prepared for planting in a very short period of time. It will, of course, be understood that the support 1 may be of sufficient size to carry a hopper from which the potatoes may pass to the chute 48. The hopper may be of any preferred form or dimensions and an example is indicated in dotted lines in Fig. 1.

Having thus described the invention, what is claimed as new is:

1. A potato cutter comprising a casing having horizontal slots in its opposite walls above its lower end, a stationary knife within and extending across the casing with its lower edge in the plane of the upper walls of said slots, a movable knife extending across the casing and slidably engaged in and supported by said slots, means for depositing potatoes upon the stationary knife, means for forcing the potatoes past the stationary knife, and means exterior of the casing connected to the ends of the movable knife for effecting travel of said knife across the lower end of the stationary knife to transversely cut the potatoes.

2. A potato cutter comprising a stationary knife, guides supported above the knife and arranged to direct potatoes onto the knife at the center thereof, a delivery chute having its discharge end disposed over the guides, a longitudinally extending checking device secured in said chute to retard the flow of potatoes therethrough, and a valve mounted transversely in the chute at the lower end of said checking device to feed potatoes through the chute at regular intervals.

3. A potato cutter comprising a stationary knife, guides supported above the knife and arranged to direct potatoes onto the same, a delivery chute having its discharge end disposed over said guides, a valve comprising a roller rotatably mounted in the bottom of the chute and having a mutilated portion to permit flow of potatoes at regular intervals, and means for operating said valve.

4. A potato cutter comprising a stationary knife, means for delivering potatoes upon said knife, means for forcing the potatoes against and past said knife, a movable knife arranged immediately below the stationary knife, levers disposed in advance of said knife, links pivoted to the free ends of said levers and to the ends of the movable knife, retractile springs acting upon said links in opposition to the levers, and means for swinging the levers in one direction whereby to move said knife through potatoes passing the stationary knife.

5. The combination of a casing, a stationary knife secured within the casing, means for depositing potatoes upon said knife, a movable knife slidably mounted in the sides of the casing and operable across the lower end of the stationary knife, links pivoted intermediate their ends to the ends of the movable knife, springs carried by the casing and attached to the rear ends of said links, levers mounted upon the casing and having their free ends projecting beyond the sides thereof and pivoted to the front ends of said links, a plunger arranged within the casing and movable toward and from the stationary knife, a crank shaft on the upper end of the casing operatively connected with the plunger, and a flexible connection between the crank shaft and the said levers whereby to move the levers in opposition to said springs and draw the movable knife through potatoes passing the stationary knife.

In testimony whereof I affix my signature.

OLE E. FLOBERG. [L. S.]